US010358129B2

(12) United States Patent
Payne et al.

(10) Patent No.: US 10,358,129 B2
(45) Date of Patent: Jul. 23, 2019

(54) SYSTEMS AND METHODS FOR DYNAMIC VEHICLE CONTROL ACCORDING TO TRAFFIC

(71) Applicant: Toyota Motor Engineering & Manufacturing North America, Inc., Erlanger, KY (US)

(72) Inventors: Joshua D. Payne, Ann Arbor, MI (US); Geoffrey David Gaither, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 120 days.

(21) Appl. No.: 15/614,769

(22) Filed: Jun. 6, 2017

(65) Prior Publication Data
US 2018/0345965 A1    Dec. 6, 2018

(51) Int. Cl.
*B60W 30/14*      (2006.01)
*B60W 30/18*      (2012.01)
*B60W 50/14*      (2012.01)

(52) U.S. Cl.
CPC .......... *B60W 30/143* (2013.01); *B60W 30/14* (2013.01); *B60W 30/18009* (2013.01);
(Continued)

(58) Field of Classification Search
CPC ..... B60W 30/18009; B60W 30/18018; B60W 2720/10; B60W 2720/103;
(Continued)

(56) References Cited

U.S. PATENT DOCUMENTS

| 6,044,321 | A | * | 3/2000 | Nakamura | ......... B60K 31/0008 180/179 |
| 6,411,883 | B1 | * | 6/2002 | Basten | ............... B60K 31/0008 180/169 |

(Continued)

FOREIGN PATENT DOCUMENTS

| JP | 11241622 A | * | 9/1999 |
| JP | 2008162563 A | * | 7/2008 |

(Continued)

OTHER PUBLICATIONS

JPO machine translation of JP 11-241622 (original JP document published Sep. 7, 1999) (Year: 1999).*

(Continued)

*Primary Examiner* — Behrang Badii
*Assistant Examiner* — David A Testardi
(74) *Attorney, Agent, or Firm* — Christopher G. Darrow; Darrow Mustafa PC (57) ABSTRACT

System, methods, and other embodiments described herein relate to operating a vehicle while in traffic. In one embodiment, a method includes, in response to detecting that a present level of the traffic proximate to the vehicle satisfies a traffic threshold, determining a control profile according to at least the present level of traffic. The control profile indicates at least an acceleration input and a target cruising speed for the vehicle that avoids braking to decelerate the vehicle while traveling in the traffic. The method includes controlling one or more vehicle systems of the vehicle according to the control profile to cause the vehicle to substantially maintain the target cruising speed while traveling in the traffic.

20 Claims, 5 Drawing Sheets

(52) U.S. Cl.
CPC ....... B60W 50/14 (2013.01); *B60W 2050/146* (2013.01); *B60W 2300/34* (2013.01); *B60W 2420/42* (2013.01); *B60W 2420/52* (2013.01); *B60W 2510/18* (2013.01); *B60W 2510/20* (2013.01); *B60W 2550/10* (2013.01); *B60W 2550/20* (2013.01); *B60W 2550/402* (2013.01); *B60W 2550/408* (2013.01); *B60W 2720/103* (2013.01); *B60W 2720/106* (2013.01)

(58) Field of Classification Search
CPC ........... B60W 2720/106; B60W 30/14; B60W 30/143; B60W 50/14; B60W 2550/20; G01C 21/3469; G08G 1/0137
See application file for complete search history.

(56) References Cited

U.S. PATENT DOCUMENTS

| | | | |
|---|---|---|---|
| 8,478,642 | B2 | 7/2013 | Dey et al. |
| 9,165,477 | B2 | 10/2015 | Wilson |
| 2002/0179355 | A1* | 12/2002 | Kurz ................ B60K 28/16 180/169 |
| 2004/0230376 | A1 | 11/2004 | Ichikawa et al. |
| 2005/0274553 | A1 | 12/2005 | Salman et al. |
| 2007/0012499 | A1* | 1/2007 | Kobayashi ................ B60T 7/22 701/300 |
| 2009/0259363 | A1 | 10/2009 | Li et al. |
| 2009/0299598 | A1* | 12/2009 | Boecker ................ B60W 30/16 701/96 |
| 2009/0326780 | A1* | 12/2009 | Waibel ................ B60W 30/16 701/96 |
| 2011/0208399 | A1* | 8/2011 | Fekete ................ G08G 1/0104 701/93 |
| 2012/0022764 | A1 | 1/2012 | Tang et al. |
| 2012/0059574 | A1* | 3/2012 | Hada ................ G08G 1/0112 701/119 |
| 2012/0109510 | A1* | 5/2012 | Ota ................ B60W 30/188 701/400 |
| 2013/0096808 | A1* | 4/2013 | DeLaSalle ........... B60W 10/06 701/110 |
| 2014/0236449 | A1* | 8/2014 | Horn ................ B60W 30/16 701/96 |
| 2015/0258996 | A1 | 9/2015 | Victor et al. |
| 2015/0291146 | A1 | 10/2015 | Prakah-Asante et al. |
| 2016/0046170 | A1 | 2/2016 | Lu |
| 2016/0144713 | A1* | 5/2016 | Verheijen ........... B60R 16/0236 701/123 |
| 2017/0043776 | A1* | 2/2017 | Sujan ................ B60W 30/188 |
| 2017/0227959 | A1* | 8/2017 | Lauffer ................ G05D 1/0088 |
| 2017/0259822 | A1* | 9/2017 | Schubert ................ B60W 10/04 |
| 2017/0322047 | A1* | 11/2017 | Verheijen ........... B60R 16/0236 |
| 2017/0327116 | A1* | 11/2017 | Heo ................ B60W 30/16 |
| 2018/0001764 | A1* | 1/2018 | Bang ................ B60K 31/0008 |

FOREIGN PATENT DOCUMENTS

| | | | |
|---|---|---|---|
| JP | 2010274839 A | * | 12/2010 |
| JP | 2011020511 A | | 2/2011 |
| JP | 2016141223 A | * | 8/2016 |

OTHER PUBLICATIONS

JPO machine translation of JP 2016-141223 (original JP document published Aug. 8, 2016) (Year: 2016).*

* cited by examiner

SYSTEMS AND METHODS FOR DYNAMIC VEHICLE CONTROL ACCORDING TO TRAFFIC

TECHNICAL FIELD

The subject matter described herein relates in general to systems for controlling vehicle systems according to traffic and, more particularly, to facilitating control of the vehicle to avoid cyclical accelerating and decelerating when driving in traffic.

BACKGROUND

Motor vehicles generally operate efficiently under consistent operating conditions and, thus, according to consistent control inputs. For example, a vehicle may attain peak fuel economy when operating at a particular highway cruising speed. However, because the driver generally operates the vehicle reactively according to changing conditions such as perceived changes in traffic, driving patterns of nearby drivers, and so on the provided manual control inputs are also reactive. Thus, the vehicle brakes, accelerates, steers, shifts, and so on as the control inputs are received in a reactive manner that may not be an optimal mode of operation. For example, when a driver operates a vehicle in traffic, the driver may provide control inputs that cyclically accelerate and decelerate the vehicle as the speed of the traffic ebbs and flows. However, decelerating the vehicle in this way is generally inefficient and causes an energy loss from the acceleration that was previously undertaken. As a result, the vehicle may suffer from difficulties such as reduced fuel economy, degraded performance, and so on when operating in traffic.

SUMMARY

In one embodiment, example systems and methods relate to a manner of improving the operation of a vehicle in traffic. For example, in one embodiment, a guidance system monitors various vehicle systems to detect when the vehicle is operating in traffic, and, in response to detecting traffic, controls one or more of the vehicle systems to improve how the vehicle operates while traveling in the traffic. That is, the disclosed guidance system can monitor for a control pattern in the vehicle control inputs provided by a driver, and/or monitor other sensor inputs to approximate traffic density in order to determine when the vehicle is traveling in traffic. Thus, the guidance system can then use the detected traffic level to control one or more responses in the vehicle that, for example, improve the operation of the vehicle while traveling in traffic.

For example, in one embodiment, the guidance system determines a control profile for controlling the vehicle to avoid braking. The guidance system can determine an acceleration and a target cruising speed for controlling the vehicle that avoids decelerating the vehicle and facilitates maintaining a consistent speed that is the target coasting speed. In one embodiment, the guidance system can display the control profile to the driver in order to provide guidance to the driver on how to control the vehicle. In further embodiments, the system can adjust various vehicle systems of the vehicle to support maintaining the control profile. In this way, the guidance system can improve an efficiency and operation of the vehicle in the traffic.

In one embodiment, a guidance system for operating a vehicle in traffic is disclosed. The guidance system includes one or more processors and a memory that is communicably coupled to the one or more processors. The memory stores a monitoring module including instructions that when executed by the one or more processors cause the one or more processors to, in response to detecting that a present level of the traffic that is proximate to the vehicle satisfies a traffic threshold, determine a control profile according to at least the present level of the traffic. The control profile indicates at least an acceleration input and a target cruising speed for the vehicle that avoids braking to decelerate the vehicle while traveling in the traffic. The memory stores a control module including instructions that when executed by the one or more processors cause the one or more processors to control one or more vehicle systems of the vehicle according to the control profile to cause the vehicle to substantially maintain the target cruising speed while traveling in the traffic.

In one embodiment, a non-transitory computer-readable medium is disclosed. The computer-readable medium stores instructions that when executed by one or more processors cause the one or more processors to perform the disclosed functions. The instructions include instructions to, in response to detecting that a present level of traffic proximate to a vehicle satisfies a traffic threshold, determine a control profile according to at least the present level of traffic. The control profile indicates at least an acceleration input and a target cruising speed for the vehicle that avoids braking to decelerate the vehicle while traveling in the traffic. The instructions include instructions to control one or more vehicle systems of the vehicle according to the control profile to cause the vehicle to substantially maintain the target cruising speed while traveling in the traffic.

In one embodiment, a method of operating a vehicle in traffic is disclosed. The method includes, in response to detecting that a present level of the traffic that is proximate to the vehicle satisfies a traffic threshold, determining a control profile according to at least the present level of the traffic. The control profile indicates at least an acceleration input and a target cruising speed for the vehicle that avoids braking to decelerate the vehicle while traveling in the traffic. The method includes controlling one or more vehicle systems of the vehicle according to the control profile to cause the vehicle to substantially maintain the target cruising speed while traveling in the traffic.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with detecting when a vehicle is traveling in traffic and controlling one or more vehicle systems to improve the operation of the vehicle in the traffic are disclosed. As mentioned previously, drivers generally control a vehicle reactively. Thus, when driving in traffic, a driver generally accelerates and brakes the vehicle in cadence with the traffic as the traffic cyclically accelerates and slows. The driver generally undertakes this behavior without regard to a loss of energy efficiency from over accelerating and then wasting the energy used to accelerate by decelerating to match a speed of the traffic. Thus, the wave pattern of the traffic congestion induces the driver to control the vehicle in, for example, a less than optimal manner.

Therefore, in one embodiment, a guidance system within the vehicle monitors the driver inputs for the noted control pattern. In response to detecting the control pattern, the guidance system can determine a control profile for controlling the vehicle in the traffic. For example, the control profile can indicate an expected acceleration input and a target cruising speed. In general, the expected acceleration input indicates an amount by which the vehicle can be accelerated to attain the target cruising speed and also to avoid decelerating the vehicle and affecting an overall energy efficiency of the vehicle. Moreover, the target cruising speed is a speed at which the vehicle can travel while in the traffic without decelerating or generally avoiding decelerating in the cyclic manner previously described. Accordingly, in one embodiment, the guidance system displays the control profile to the driver through a display within the vehicle or otherwise informs the driver about how to control the vehicle in order to achieve the target cruising speed.

In further aspects, the guidance system can also control various vehicle systems in order to support maintaining the target cruising speed. For example, the guidance system can adjust bounds (e.g., upper and/or lower limits) of the state of charge (SOC) on batteries of the vehicle, provide autonomous and/or assistive controls, and so on. In this way, the guidance system improves an energy efficiency of the vehicle when the vehicle is operating in traffic.

Figure 1:
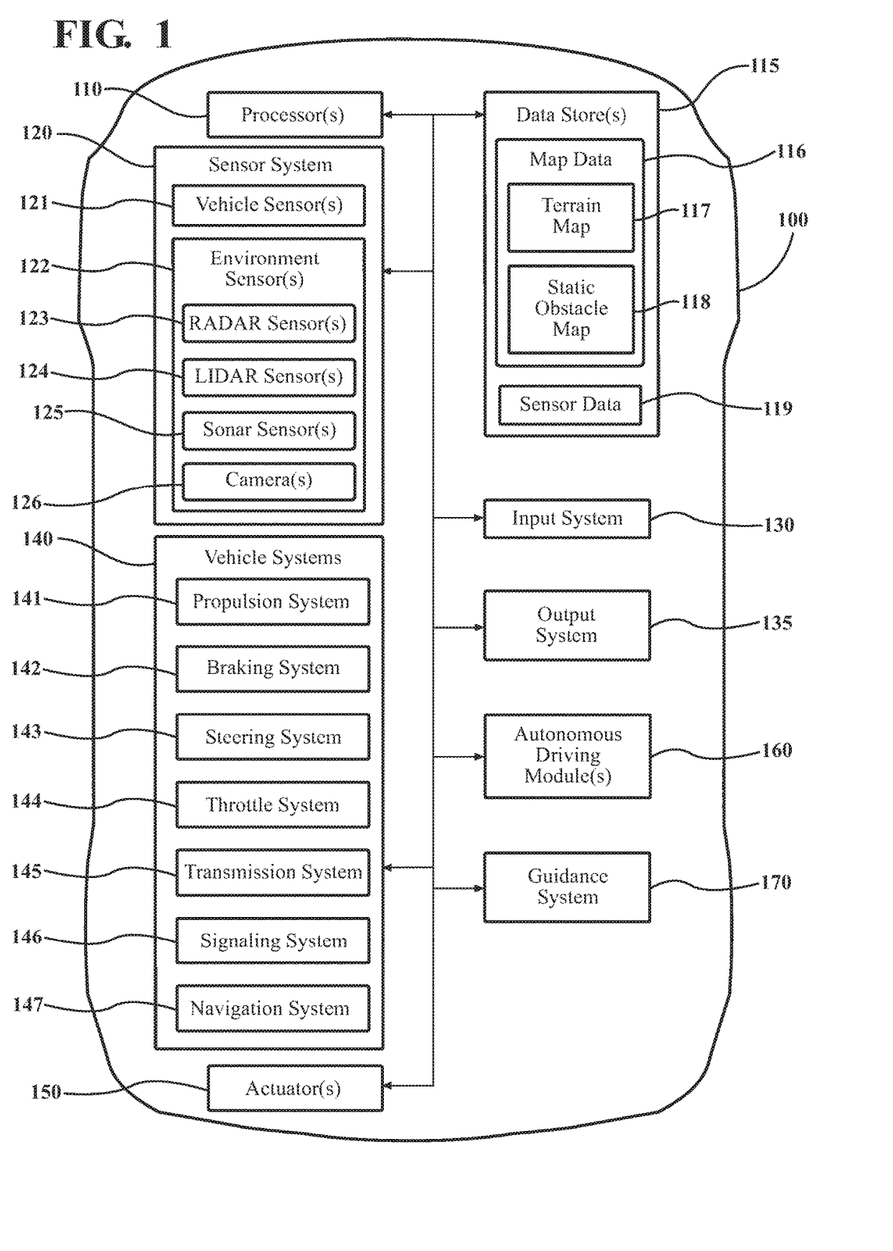
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, benefits from detecting when the vehicle 100 is traveling in traffic and controlling one or more aspects of the vehicle 100 to mitigate effects of the traffic as discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a guidance system 170 that is implemented to perform methods and other functions as disclosed herein relating to controlling various vehicle systems to improve energy efficiency responsive to detecting the vehicle 100 is operating in traffic. The noted functions and methods will become more apparent with a further discussion of the figures.

Figure 2:
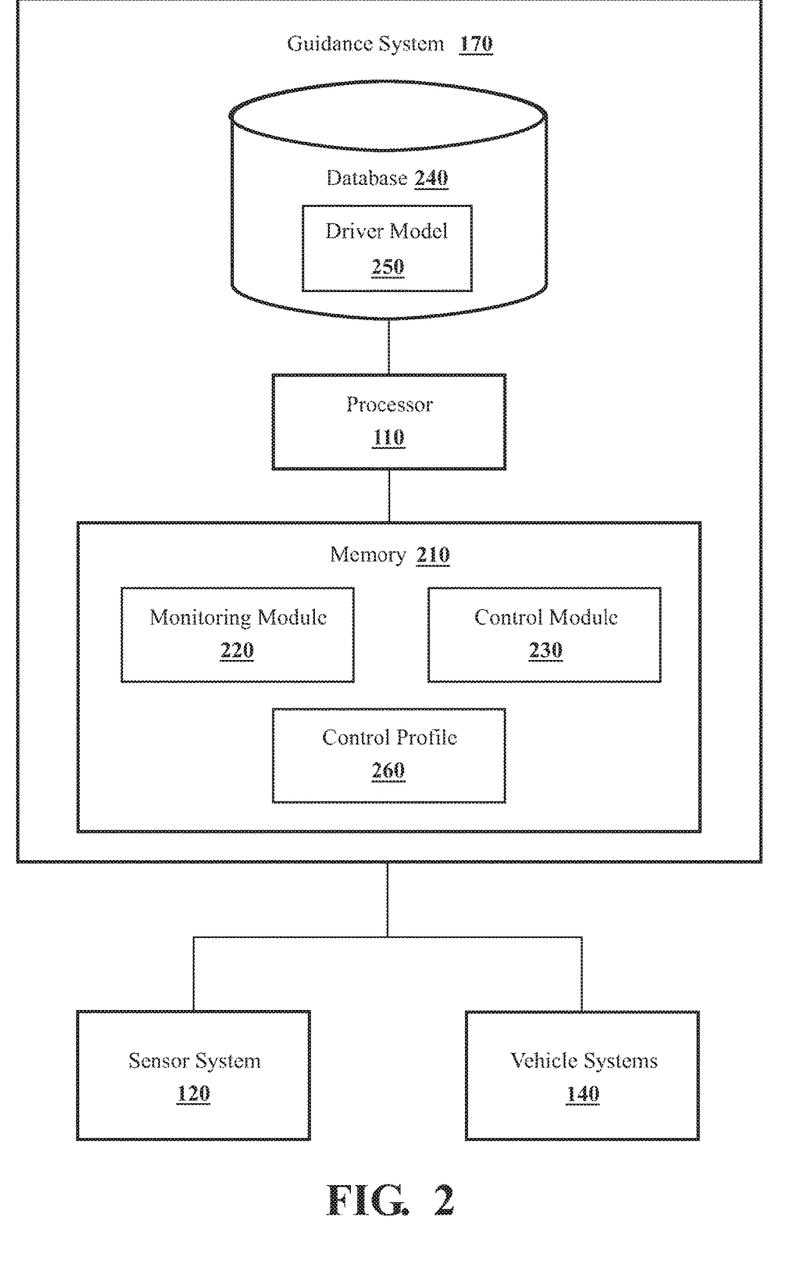
FIG. 2 illustrates one embodiment of a guidance system that is associated with adjusting vehicle systems to improve the operation of a vehicle in traffic.

With reference to FIG. 2, one embodiment of the guidance system 170 of FIG. 1 is further illustrated. The guidance system 170 is shown as including a processor 110 from the vehicle 100 of FIG. 1. Accordingly, the processor 110 may be a part of the guidance system 170, the guidance system 170 may include a separate processor from the processor 110 of the vehicle 100, or the guidance system 170 may access the processor 110 through a data bus or another communication path. In one embodiment, the guidance system 170 includes a memory 210 that stores a monitoring module 220 and a control module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, in one embodiment, the monitoring module 220 generally includes instructions that function to control the processor 110 to acquire control information and/or sensor data from, for example, one or more sensors of the sensor system 120. The control information is, in one embodiment, information from accelerator pedal sensors, brake pedal sensors, and so on. In general, the control information identifies control inputs from the driver of the vehicle 100. In further embodiments, the monitoring module 220 also acquires sensor data from a Lidar 124, a radar 123, a camera 126, a navigation system 147, an IMU, and/or other sensors in order to ascertain a present level of traffic congestion. However, in one embodiment, the monitoring module 220, at least initially, monitors an electronic stream of the control information to identify a control pattern that is indicative of traffic congestion.

The control pattern can take different forms but is generally characterized by cyclical acceleration inputs and deceleration inputs. That is, the control pattern defines repetitive accelerations of the vehicle 100 followed by decelerations of the vehicle 100 that are indicative of how the driver controls the vehicle 100 while in traffic. As one analogy of this general acceleration and deceleration behavior, consider that the vehicles on a roadway (e.g., highway) with traffic congestion produce a wave-like effect or, in other words, a congestion shockwave. As vehicles begin to move within the traffic, the drivers have a behavioral tendency to accelerate quickly. However, as the available space within the traffic is consumed by the quickly accelerating vehicles, the vehicles then decelerate. This behavior generates a wave that travels sequentially along the roadway in a wave-like pattern formed from the vehicles accelerating and then decelerating as the congestion increases. Particular aspects of this behavior will be discussed in greater detail subsequently. However, it should be appreciated that an associated control pattern that is provided by a driver when operating a vehicle in traffic generally correlates with the cyclical nature of this traffic congestion wave.

In either case, the monitoring module 220 identifies that the vehicle 100 is operating in the traffic by identifying the control pattern within the driver inputs. Moreover, a level/density of the traffic congestion correlates with, for example, a period of the control inputs and/or an amplitude of the control inputs. Furthermore, the monitoring module 220, in one embodiment, analyzes inputs from one or more sensors to confirm the presence of traffic and/or to determine a particular density of the traffic. By detecting the traffic and the density of the traffic according to the control pattern and/or additional sensor inputs, the monitoring module 220 can then determine a control profile to facilitate operating the vehicle 100 in traffic. As previously indicated, the control profile identifies a target cruising speed for maintaining a consistent speed of the vehicle 100 in the traffic instead of traveling at varying speeds determined according to the cyclical acceleration/deceleration patterns of the traffic.

Moreover, in various embodiments, the monitoring module 220 can determine the control profile using different methods. That is, the monitoring module 220 can, in one embodiment, calculate the components of the control profile according to the detected control pattern. In further embodiments, the monitoring module 220 uses a lookup table or database stored in the guidance system 170 that includes defined control profiles for different levels/densities of traffic. In still further embodiments, the monitoring module 220 can implement a computational model such as a neural network or other form of machine learning that accepts electronic inputs about the present operating conditions of the vehicle 100 (e.g., level of traffic, etc.) and produces an output that is the control profile. In either case, the monitoring module 220 can detect the presence of traffic and provide the control profile in order to improve the operation of the vehicle 100 in the traffic.

In further aspects, the monitoring module 220 can also learn driver behaviors in particular traffic scenarios, learn different aspects of how traffic speeds change with varying congestion levels, and so on. Thus, the monitoring module 220 can collect data from sensors of the vehicle 100, various system so the vehicle 100, and other sources (e.g., remote monitoring sources) to train and/or generate the driver model 250 to identify traffic and aspects relating to the traffic so that the monitoring module 220 in combination with the driver model 250 can predict traffic/driver behavior to provide control profiles that avoid braking while operating in traffic.

Furthermore, the guidance system 170, in one embodiment, also includes the control module 230 that generally includes instructions that function to control the processor 110 to control one or more of the vehicle systems 140 according to the control profile. For example, in one embodiment, the control module 230 controls a human-machine interface (HMI) such as an in-dash display to render the control profile in a graphical form to the driver in order to inform the driver about how to control the vehicle 100 to achieve the target cruising speed. That is, in one embodiment, the control module 230 causes the display to provide a graph and/or explicit instructions of a speed profile including an initial acceleration and subsequent target cruising speed that maintains the vehicle 100 in a consistent moving state while avoiding braking/decelerating. Thus, in one embodiment, the control module 230 can coach the driver by providing indications of particular acceleration inputs, when to coast, when to shift, and so on. For example, in one aspect, the control module 230 renders graphical elements indicate the control profile while also grading the manual inputs of the driver in relation to how closely the driver is controlling the vehicle 100 to the control profile.

Furthermore, the control module 230 can, in one embodiment, provide controls similar to an adaptive cruise control system that prioritizes the target cruising speed over, for example, maintaining a distance from another vehicle. That is, the control module 230 can vary a distance from a vehicle ahead of the vehicle 100 in order to prioritize maintaining the target cruising speed. Moreover, the control module 230 can adjust various ones of the vehicle systems 140 to facilitate maintaining and/or achieving the target cruising speed. For example, the control module 230 can, in one embodiment, temporarily adjust the lower bound of a state of charge (SOC) of a vehicle battery to permit an additional acceleration when maintaining the target cruising speed. In further aspects, the control module 230 can control the vehicle systems 140 to support efficient charging during periods of coasting, pre-charging the vehicle battery to a particular level, adjusting engine operation for an upcoming acceleration, and so on.

In one embodiment, the guidance system 170 includes the database 240. The database 240 is, for example, an electronic data structure stored in the memory 210 or another electronic data store and that is configured with routines that can be executed by the processor 110 for analyzing stored data, providing stored data, organizing stored data, and so on. Thus, in one embodiment, the database 240 stores data used/provided by the modules 220 and 230 in executing various functions. In one embodiment, the database 240 includes a driver model 250, control profiles 260, logged sensor data, logged traffic data, logged vehicle data, one or more computational models, and so on. In one embodiment, the driver model 250 is a computational model that models driver behaviors in relation to various types of traffic. Thus, the monitoring module 220 may use the driver model 250 when detecting the presence/level of traffic, when producing a control profile, and so on.

Figure 3:
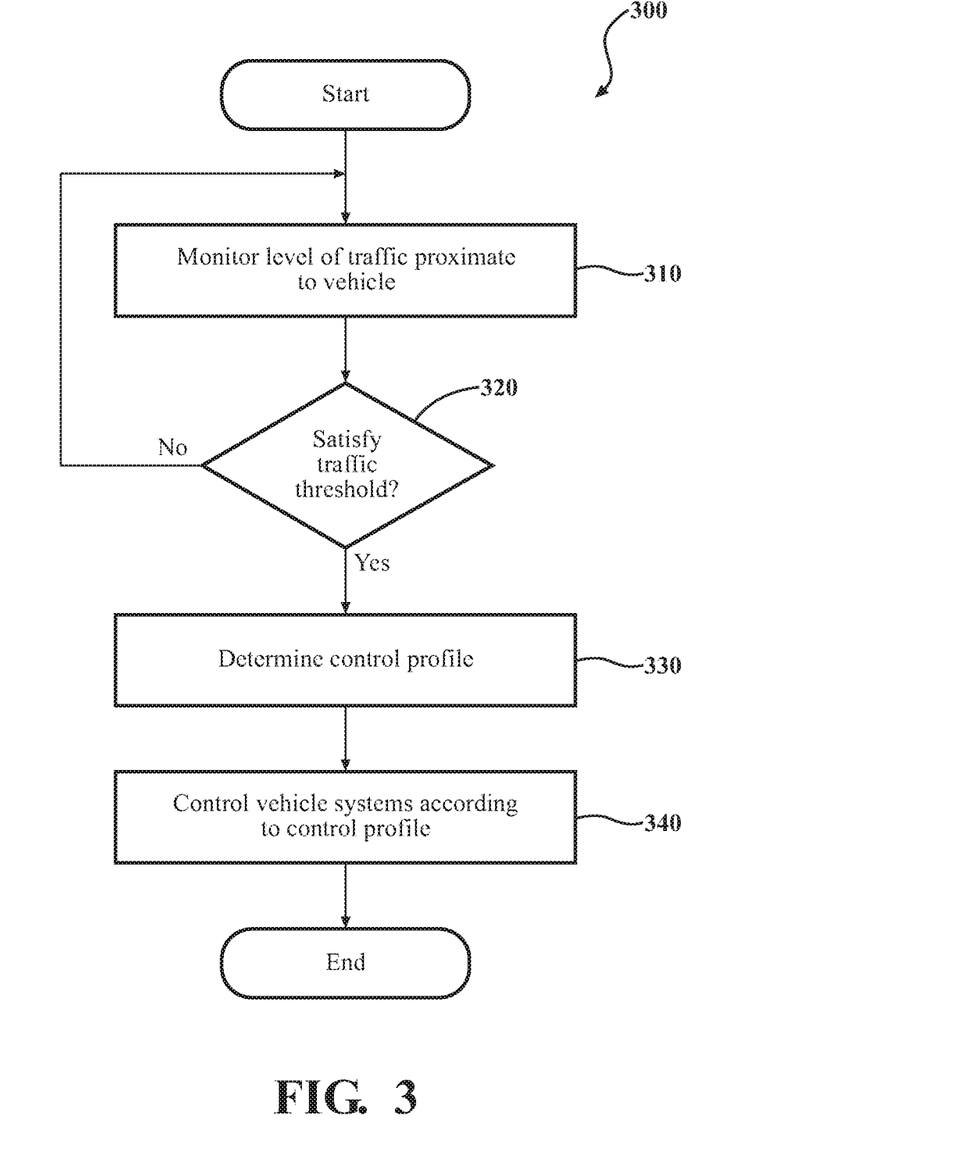
FIG. 3 illustrates one embodiment of a method that is associated with detecting traffic and adjusting the operation of vehicle systems.

Additional aspects of controlling vehicle systems according to a detected level of traffic will be discussed in relation to FIG. 3. FIG. 3 illustrates a flowchart of a method 300 that is associated with controlling one or more vehicle systems according to a detected level of traffic. Method 300 will be discussed from the perspective of the guidance system 170 of FIGS. 1 and 2. While method 300 is discussed in combination with the guidance system 170, it should be appreciated that the method 300 is not limited to being implemented within the guidance system 170, but is instead one example of a system that may implement the method 300.

At 310, the monitoring module 220 monitors for traffic. In one embodiment, the monitoring module 220 monitors control inputs from a driver by, for example, electronically monitoring positions of a brake pedal and an accelerator pedal. The monitoring module 220 can monitor these control inputs over time in order to detect a control pattern that is indicative of the vehicle 100 being driven in traffic.

Figure 4:
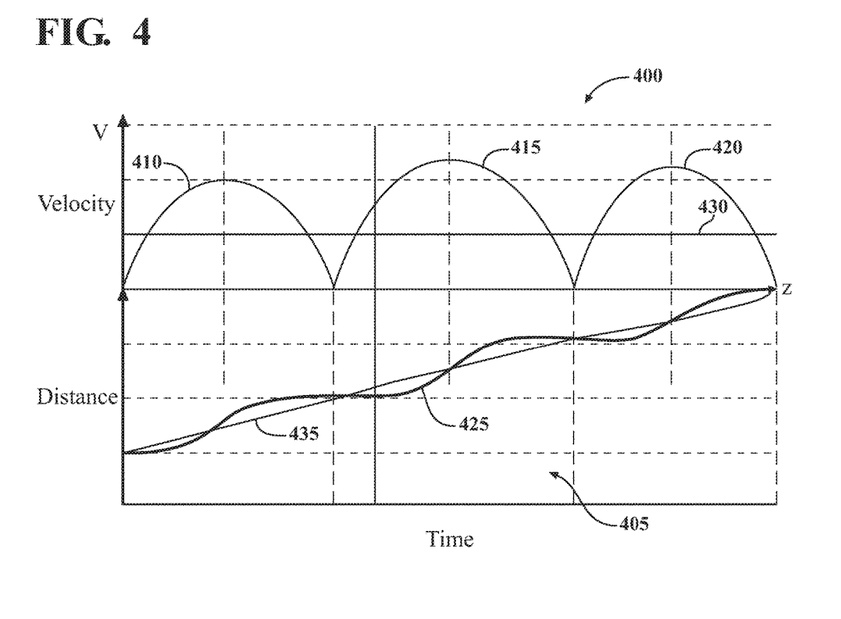
FIG. 4 is a graph illustrating an example control pattern as a function of velocity and as a function of distance.

For example, FIG. 4 illustrates a graph 400 of a velocity the vehicle 100 over time and a graph 405 of distance over time. The graph 400 includes three "humps" 410, 415, and 420 that represent separate acceleration/deceleration events by the vehicle 100. The acceleration/deceleration humps 410, 415, and 420 are further reflected in the distance line 425 illustrated in the graph 405. In both cases, the graphs 400 and 405 illustrate the cyclical pattern of speeding up followed by slowing down that is indicative of traveling in traffic. Moreover, as shown in line 425, the rapid accumulation of distance is illustrated while accelerating followed by a period of little movement before the cycle repeats. Thus, the general control pattern illustrated in the graphs 400 and 405 is an indicator of the present level of traffic in which the vehicle 100 is operating. It should be appreciated, that the graphs 400 and 405 generally illustrate one example of how a control pattern may develop while traveling in traffic. Accordingly, under different conditions (e.g., higher density traffic, lower density traffic, etc.) the graphs may have a steeper acceleration/deceleration profile, a blocked profile (e.g., reaching a max speed for a period of time before decelerating), a more gradual profile, and so on. Consequently, the control pattern of the vehicle 100 can span a continuum of possible profiles depending on particular conditions and levels of traffic within which the vehicle 100 is operating.

In either case, the monitoring module 220 can continuously monitor the operation of the vehicle 100 for a control pattern that is indicative a presence of traffic. In general, such a control pattern is similar to that illustrated in FIG. 4 and thus the monitoring module 220 generally monitors for control patterns similar to the illustrated pattern of the graph 400 and within, for example, a traffic threshold of the noted graph.

At 320, the monitoring module 220 determines if the detected control inputs are indicative of traffic. In one embodiment, the monitoring module 220 can normalize detected inputs and compare the detected inputs against an exemplary control pattern such as the illustrated pattern of the graph 400 to determine whether the detected inputs are within a traffic threshold (e.g., plus or minus by a defined degree) of the exemplary pattern. In further embodiments, the traffic threshold indicates a frequency of accelerating and decelerating the vehicle that correlates with identifying the presence of the traffic. Thus, the monitoring module 220 can analyze the inputs to identify how often the acceleration/deceleration controls are repeating to determine if the vehicle 100 is operating in traffic.

Moreover, the monitoring module 220 can analyze electronic inputs from at least one sensor of the sensor system 120 and/or the vehicle system 140 to determine a density of additional vehicles proximate to the vehicle 100 and/or a traveling speed of the additional vehicles. In further aspects, the monitoring module 220 can also compare the density with the traffic threshold to confirm the present level of the traffic. For example, at 320, the monitoring module 220 can further analyze electronic inputs from a camera 126, a proximity sensor, a radar 123, a navigation sensor 147, a speed sensor, a vehicle-to-vehicle (v2v) communication device, and a vehicle-to-infrastructure (v2i) communication device, a lidar 124, and so on. Thus, according to the detected control inputs from 310 and/or electronic inputs from various sensors, the monitoring module 220, at 320, determines whether the present level of traffic satisfies the traffic threshold.

Consequently, if the monitoring module 220 determines that the vehicle 100 is not presently traveling in traffic, then the monitoring module 220 continues to monitor for traffic as discussed at 310.

However, if the monitoring module 220 determines the vehicle 100 is traveling in traffic, then the monitoring module 220 generates or otherwise determines the control profile 260 at 330. Accordingly, in one embodiment, the monitoring module 220 provides the control profile 260 with predicted acceleration inputs, coasting periods, and/or other information/suggested adjustments that cause the vehicle 100 to substantially maintain the target cruising speed while operating in traffic. As such, the control profile 260 is generally targeted to avoid using the brakes of the vehicle 100 to decelerate. This is because, for example, using the brakes is inefficient in comparison to coasting. Thus, in order to optimize the operation of the vehicle 100, the monitoring module 220 produces the control profile 260 to avoid the use of the brakes including, in one embodiment, regenerative brakes, if present on the vehicle 100.

As one example, further consider the graphs 400 and 405 of FIG. 4. As illustrated, the graph 400 includes a line 430 that represents an average speed of the vehicle 100 while traveling in traffic. Similarly, the line 435 represents a constant progression in distance as would be experienced when traveling according to the average speed 430. Thus, the lines 430 and 435 in comparison to 410, 415, 420, and 425 illustrate a contrast between the cyclical acceleration/deceleration behavior and a consistent target cruising speed. Therefore, the monitoring module 220 produces the control profile 260 with the goal of achieving operation similar to the average speed 430.

Figure 5:
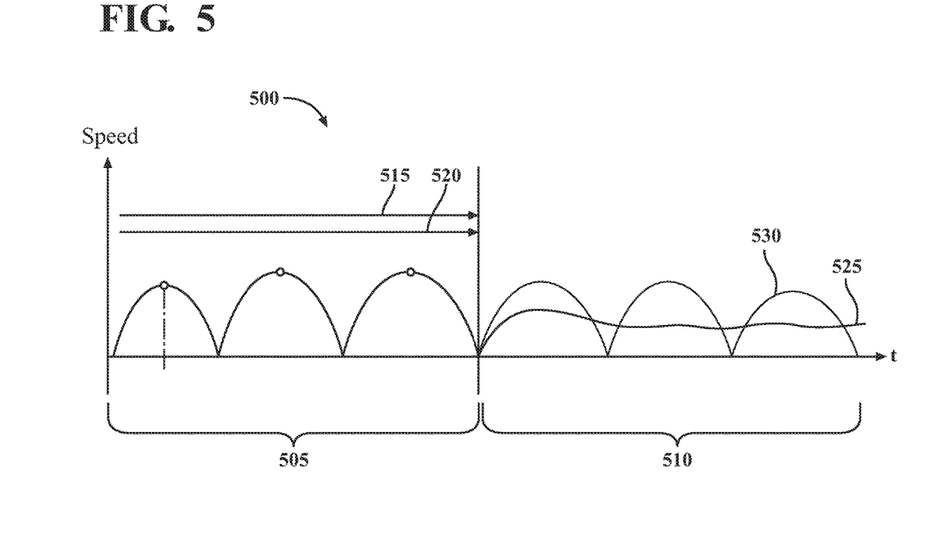
FIG. 5 is a graph illustrating an example control pattern associated with traffic and an example control profile.

As a further example, FIG. 5 illustrates a graph 500 with an initial detection phase 505 followed by a control phase 510 that is an exemplary period of time during which the vehicle 100 is operating according to a provided control profile 260. Thus, the monitoring module 220 initially detects the presence of the traffic over the detection phase 505. In various embodiments, a length of the detection phase 505 can vary according to various implementation factors such as a degree of certainty, a distinctiveness of the particular traffic, and so on. In either case, the monitoring module 220, in one embodiment, uses characteristics of how the vehicle 100 is operating during the phase 505 to determine the control profile 260. That is, for example, the monitoring module 220 determines a frequency of the control inputs, an amplitude of the control inputs, a rate of acceleration/deceleration, and so on in order to compute the control profile 260.

Thus, as shown in FIG. 5, the monitoring module 220 may determine a distance 515 over a period of time 520 for the detection phase 505. Accordingly, the monitoring module 220 can then calculate the control profile 260 as an average speed to use as the target cruising speed and also calculate an efficient acceleration that results in the vehicle 100 achieving the target cruising speed. As shown in FIG. 5, a target cruising speed 525 is illustrated against a speed of surrounding traffic 530 including an initial acceleration input. Thus, the target cruising speed provides for consistent operation of the vehicle 100 in comparison to the acceleration/deceleration exhibited in the speed 530 of the surrounding traffic.

In further aspects, the monitoring module 220 can also provide margins above and below the target cruising speed for coasting periods prior to providing further acceleration inputs, provide indicators for controlling various other systems of the vehicle 100 and so on. For example, the monitoring module 220 can compute the control profile 260 to include indicators for when to pre-charge a battery of the vehicle 100, when SOC bound expansion is acceptable, when to prepare a motor of the vehicle 100 for an acceleration, and so on. Moreover, it should be appreciated that the monitoring module 220, as previously discussed, can compute the control profile 260 and/or determine from the control profile 260 from a data source in several different ways. In either case, the monitoring module 220 provides the control profile 260 as a manner of facilitating efficient control of the vehicle 100 when the vehicle 100 is operating in traffic.

At 340, the control module 230 controls one or more vehicle systems 140 according to the control profile 260. In one embodiment, the control module 230 controls one or more aspects of an output system 135, a display, and/or another system to produce the control profile 260 as a visual coach to the driver. That is, for example, the control module 230 renders graphics on a display in a dash of the vehicle 100, that is part of an infotainment system, on a heads-up display (HUD), within an augmented reality (AR) system, or through another display means in order to provide instructions to the driver about how to control the vehicle 100 to attain the target coasting speed while operating the vehicle 100 in traffic.

In various aspects, the graphic elements used to display the control profile 260 may include graphs, text instructions, pictographs, heat maps in response to actual driver inputs, and so on. Moreover, the control module 230 can also provide further controls according to the control profile 260 to improve an efficiency of how the vehicle 100 operates in the traffic. For example, in one embodiment, the control module 230 provides partial controls for controlling the vehicle 100 according to the control profile 260. That is, when the vehicle 100 is operating in traffic and according to the control profile 260, the control module 230 can control the vehicle to at least accelerate and decelerate according to the control profile 260 when the driver is providing inadequate manual control inputs. Thus, the control module 230 can monitor inputs from the driver in comparison to expected controls that will maintain the vehicle 100 operating according to the control profile 260 and take over control from the driver when the manual driver control are not within a threshold variation of the expected controls. In further aspects, the control module 230 can provide varying degrees of responses when the expected controls are not within the threshold variation of the expected controls. For example, the control module 230 can initially provide an alert or warning and, if the driver does not respond to the alert, then the control module 230 can takeover control or provide partial control to nudge the vehicle 100 back toward the expected inputs.

Thus, by way of example, as the driver provides control inputs for accelerating and decelerating the vehicle 100, the control module 230 determines whether the control inputs are within the threshold variance (e.g., <10% difference) of the expected controls. When the control module 230 determines that the driver control inputs exceed the threshold variance, the control module 230 can nudge the controls to meet the maximum variance and/or fully take over the control inputs to provide the expected controls. In either case, the control module 230 can selectively intervene (and for example bypass the driver control inputs) in order to ensure the vehicle 100 operates according to the control profile 260.

Moreover, as previously indicated, the control module 230 can control further systems of the vehicle 100 to adjust operation in support of maintaining the control profile 260. For example, the control module 230 can adjust upper and/or lower bounds of a state of charge (SOC) on a battery of the vehicle 100. That is, as one example, when the vehicle 100 is to accelerate according to the control profile 260, but there is insufficient charge available in the battery according to current bounds on the SOC, then the control module 230 can temporarily adjust the bound downward to permit the acceleration without initiating a combustion motor.

Moreover, the control module 230 can, in one embodiment, adjust the SOC bound upward to permit additional charging in anticipation of, for example, upcoming accelerations. Furthermore, the control module 230 can also initiate various systems to support operating according to the control profile 260, disable particular ones of the vehicle systems 140 to conserve energy, and so on.

Figure 6:
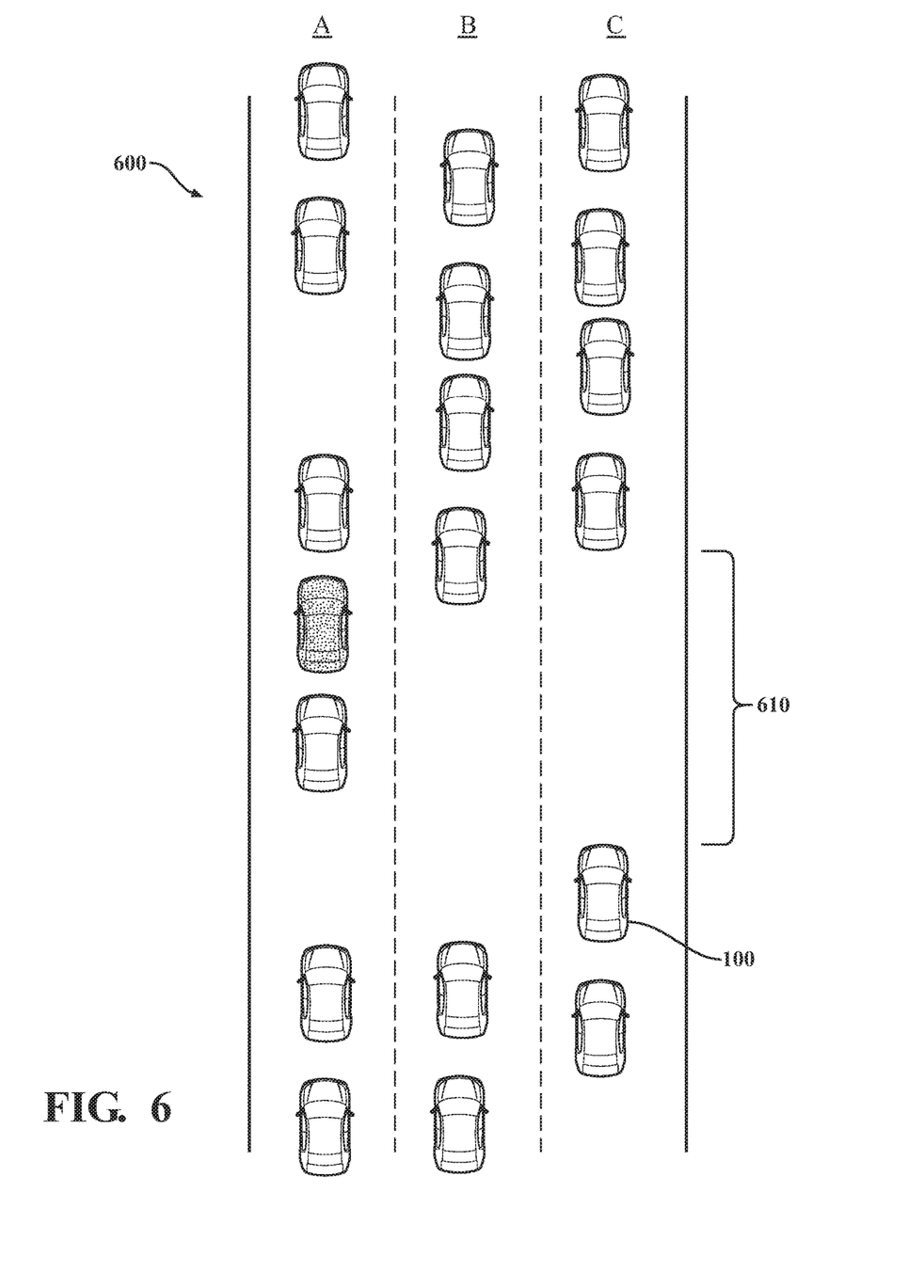
FIG. 6 is an overhead view of an example traffic pattern of a roadway.

As a further example of how the guidance system 170 can adjust the operation of the vehicle 100 when the vehicle 100 is operating in traffic, consider FIG. 6. FIG. 6 illustrates an overhead view of an example roadway 600 that is shown with a particular traffic scenario. As illustrated on the roadway 600, many vehicles are traveling in separate lanes labeled A, B, and C. Each lane has a respective gap 610. The gap 610 illustrates how a wave can propagate through traffic causing the previous mentioned cyclical behavior of accelerating and decelerating. Thus, as shown in FIG. 6, vehicles beyond the gap 610 would be decelerating or stopped, whereas vehicles prior to the gap 610 would generally be accelerating since those vehicles have free space into which they can accelerate. However, as indicated, because the vehicles beyond the gap have slowed or are slowing, the vehicles that are presently accelerating will quickly also need to decelerate in order to avoid collisions. In this way, a wave of accelerating/decelerating propagates through the traffic.

However, when the vehicle 100 operates to detect the traffic and mitigate the efficiencies of accelerating/decelerating in this pattern, the guidance system 170 detects the traffic and facilitates the driver of the vehicle 100 to provide a measured control according to the control profile 260. In this way, the vehicle 100 does not consume the gap in an overly expeditious manner and thus can maintain a relatively consistent speed without decelerating. Therefore, the vehicle 100 operates with an improved energy efficiency because energy is not lost to the repetitive decelerations.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the guidance system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the guidance system 170, and/or the autonomous driving module(s) 160 may control some or all of these vehicle systems 140 and, thus, may be partially or fully autonomous.

The processor(s) 110, the guidance system 170, and/or the autonomous driving module(s) 160 can be operatively connected to communicate with the various vehicle systems 140 and/or individual components thereof. For example, returning to FIG. 1, the processor(s) 110, the guidance system 170, and/or the autonomous driving module(s) 160 can be in communication to send and/or receive information from the various vehicle systems 140 to control the movement, speed, maneuvering, heading, direction, etc. of the vehicle 100. The processor(s) 110, the guidance system 170, and/or the autonomous driving module(s) 160 may control some or all of these vehicle systems 140.

The processor(s) 110, the guidance system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the guidance system 170, and/or the autonomous driving module(s) 160 can control the direction and/or speed of the vehicle 100. The processor(s) 110, the guidance system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). In one embodiment, the guidance system 170 can collect data about control signals from the processor 110 and the autonomous driving module 160 that cause the vehicle to accelerate, decelerate, and perform other various maneuvers and/or why the autonomous driving module 160 induced the maneuvers. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the guidance system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A guidance system for operating a vehicle in traffic, comprising:
   one or more processors;
   a memory communicably coupled to the one or more processors and storing:
   a monitoring module including instructions that when executed by the one or more processors cause the one or more processors to, in response to detecting that a present level of the traffic that is proximate to the vehicle satisfies a traffic threshold, determine a control profile according to at least the present level of the traffic, wherein the control profile indicates at least an acceleration input and a target cruising speed for the vehicle that does not include braking to decelerate the vehicle while traveling in the traffic; and
   a control module including instructions that when executed by the one or more processors cause the one or more processors to control one or more vehicle systems of the vehicle according to the control profile to cause the vehicle to substantially maintain the target cruising speed while traveling in the traffic by at least partially bypassing control inputs produced by an operator and at least partially controlling the vehicle when the control inputs are not within a threshold variation from the control profile.

2. The guidance system of claim 1, wherein the control module further includes instructions to control the one or more vehicle systems by:
   generating, on an electronic display, instructions about the control profile to inform the operator of the vehicle how to manually provide control inputs to maintain the target cruising speed without braking while operating the vehicle in the traffic.

3. The guidance system of claim 2, wherein the control module further includes instructions to control the one or more vehicle systems by:
   adjusting operation of the one or more vehicle systems to support maintaining the target cruising speed by performing one or more of: adjusting bounds of a state of charge (SOC) of a battery, and providing an alert when the control inputs exceed the threshold variation.

4. The guidance system of claim 1, wherein the monitoring module further includes instructions to determine the control profile by generating the control profile with predicted acceleration inputs and coasting periods that cause the vehicle to substantially maintain the target cruising speed while without periodically braking the vehicle to decelerate while in the traffic,
   wherein the control module includes instructions to control the one or more vehicle systems by at least partially bypassing control inputs includes providing partial controls for controlling the vehicle according to the control profile, and
   wherein bypassing the control inputs includes monitoring the control inputs for accelerating controls and decelerating controls of the operator in comparison to expected controls for maintaining the target cruising speed.

5. The guidance system of claim 1, wherein the monitoring module further includes instructions to detect the present level of the traffic by analyzing control inputs for accelerating and decelerating the vehicle to identify a control pattern that correlates with operating the vehicle in the traffic, wherein the traffic threshold indicates a frequency of accelerating and decelerating the vehicle that correlates with a presence of traffic congestion, and
   wherein the monitoring module further includes instructions to detect the present level of the traffic by comparing the control pattern with the traffic threshold to determine if the frequency indicated by the control pattern is indicative of the traffic.

6. The guidance system of claim 1, wherein the monitoring module further includes instructions to detect the present level of the traffic by i) analyzing electronic inputs from at least one sensor to determine a density of additional vehicles proximate to the vehicle and a traveling speed of the additional vehicles, and ii) comparing the density with the traffic threshold to confirm the present level of the traffic.

7. The guidance system of claim 6, wherein the monitoring module further includes instructions to analyze the electronic inputs by analyzing the electronic inputs from at least one of a camera, a proximity sensor, a radar, a navigation sensor, a speed sensor, a vehicle-to-vehicle (v2v) communication device, and a vehicle-to-infrastructure (v2i) communication device.

8. The guidance system of claim 6, wherein the monitoring module further includes instructions to collect vehicle data from one or more of the vehicle systems when the traffic threshold is satisfied by logging the vehicle data about control inputs from a driver that characterize how the driver is operating the vehicle for the present level of the traffic,
   wherein the monitoring module further includes instructions to generate a driver model from the vehicle data to correlate behaviors of the driver with the present level of the traffic, wherein the driver model characterizes how the driver is likely to operate the vehicle for the present level of the traffic and predicts the control profile for controlling the vehicle in the present level of the traffic without periodic braking.

9. A non-transitory computer-readable medium storing instructions that when executed by one or more processors cause the one or more processors to:
in response to detecting that a present level of traffic proximate to a vehicle satisfies a traffic threshold, determine a control profile according to at least the present level of traffic, wherein the control profile indicates at least an acceleration input and a target cruising speed for the vehicle that does not include braking to decelerate the vehicle while traveling in the traffic; and
control one or more vehicle systems of the vehicle according to the control profile to cause the vehicle to substantially maintain the target cruising speed while traveling in the traffic by at least partially bypassing control inputs produced by an operator and at least partially controlling the vehicle when the control inputs are not within a threshold variation from the control profile.

10. The non-transitory computer-readable medium of claim 9, wherein the instructions to control the one or more vehicle systems include instructions to generate, on an electronic display, instructions about the control profile to inform an operator of the vehicle how to manually provide control inputs to maintain the target cruising speed without braking while operating the vehicle in the traffic.

11. The non-transitory computer-readable medium of claim 10, wherein the instructions to control the one or more vehicle systems further include instructions to:
adjust operation of the one or more vehicle systems to support maintaining the target coasting speed by performing one or more of: adjusting bounds of a state of charge (SOC) of a battery, and providing an alert when the control inputs exceed the threshold variation.

12. The non-transitory computer-readable medium of claim 9, wherein the instructions to detect the present level of the traffic include instructions to analyze control inputs for accelerating and decelerating the vehicle to identify a control pattern that correlates with operating the vehicle in the traffic, wherein the traffic threshold indicates a frequency of accelerating and decelerating the vehicle that correlates with a presence of traffic congestion,
wherein the instructions to detect the present level of the traffic include instructions to compare the control pattern with the traffic threshold to determine if the frequency indicated by the control pattern is indicative of the traffic,
wherein the instructions to control the one or more vehicle systems by at least partially bypassing control inputs includes providing partial controls for controlling the vehicle according to the control profile, and
wherein bypassing the control inputs includes monitoring the control inputs for accelerating controls and decelerating controls of the operator in comparison to expected controls for maintaining the target cruising speed.

13. The non-transitory computer-readable medium of claim 9, wherein the instructions to determine the control profile include instructions to generate the control profile with predicted acceleration inputs and coasting periods that cause the vehicle to substantially maintain the target cruising speed while without periodically braking the vehicle to decelerate while in the traffic.

14. A method of operating a vehicle in traffic, comprising:
in response to detecting that a present level of the traffic that is proximate to the vehicle satisfies a traffic threshold, determining a control profile according to at least the present level of the traffic, wherein the control profile indicates at least an acceleration input and a target cruising speed for the vehicle that does not include braking to decelerate the vehicle while traveling in the traffic; and
controlling one or more vehicle systems of the vehicle according to the control profile to cause the vehicle to substantially maintain the target cruising speed while traveling in the traffic by at least partially bypassing control inputs produced by an operator and at least partially controlling the vehicle when the control inputs are not within a threshold variation from the control profile.

15. The method of claim 14, wherein controlling the one or more vehicle systems includes:
generating, on an electronic display, instructions about the control profile to inform the operator of the vehicle how to manually provide control inputs to maintain the target cruising speed without braking while operating the vehicle in the traffic.

16. The method of claim 15, wherein controlling the one or more vehicle systems includes:
adjusting operation of the one or more vehicle systems to support maintaining the target cruising speed by performing one or more of: adjusting bounds of a state of charge (SOC) of a battery, and providing an alert when the control inputs exceed the threshold variation.

17. The method of claim 14, wherein determining the control profile includes generating the control profile with predicted acceleration inputs and coasting periods that cause the vehicle to substantially maintain the target cruising speed while without periodically braking the vehicle to decelerate while in the traffic,
wherein controlling the one or more vehicle systems by at least partially bypassing control inputs includes providing partial controls for controlling the vehicle according to the control profile, and
wherein bypassing the control inputs includes monitoring the control inputs for accelerating controls and decelerating controls of the operator in comparison to expected controls for maintaining the target cruising speed.

18. The method of claim 14, wherein detecting the present level of the traffic includes analyzing control inputs for accelerating and decelerating the vehicle to identify a control pattern that correlates with operating the vehicle in the traffic,
wherein the traffic threshold indicates a frequency of accelerating and decelerating the vehicle that correlates with identifying a presence of traffic congestion, and
wherein detecting the present level of the traffic includes comparing the control pattern with the traffic threshold to determine if the frequency indicated by the control pattern is indicative of the traffic.

19. The method of claim 14, wherein detecting the present level of the traffic includes i) analyzing electronic inputs from at least one sensor to determine a density of additional vehicles proximate to the vehicle and a traveling speed of the additional vehicles, and ii) comparing the density with the traffic threshold to confirm the present level of the traffic,
wherein analyzing the electronic inputs includes analyzing the electronic inputs from at least one of a camera, a proximity sensor, a radar, a navigation sensor, a speed sensor, a vehicle-to-vehicle (v2v) communication device, and a vehicle-to-infrastructure (v2i) communication device.

20. The method of claim 19, further comprising:

collecting vehicle data from one or more of the vehicle systems when the traffic threshold is satisfied by logging the vehicle data about control inputs from a driver that characterize how the driver is operating the vehicle for the present level of the traffic; and generating a driver model from the vehicle data to correlate behaviors of the driver with the present level of the traffic, wherein the driver model characterizes how the driver is likely to operate the vehicle for the present level of the traffic and predicts the control profile for controlling the vehicle in the present level of the traffic without periodic braking.

\* \* \* \* \*